INVENTORS
CORNELIUS OTTO JONKERS
FOPPE HILBERTUS FOCKENS
BY
Mason, Mason & Albright
Attorneys

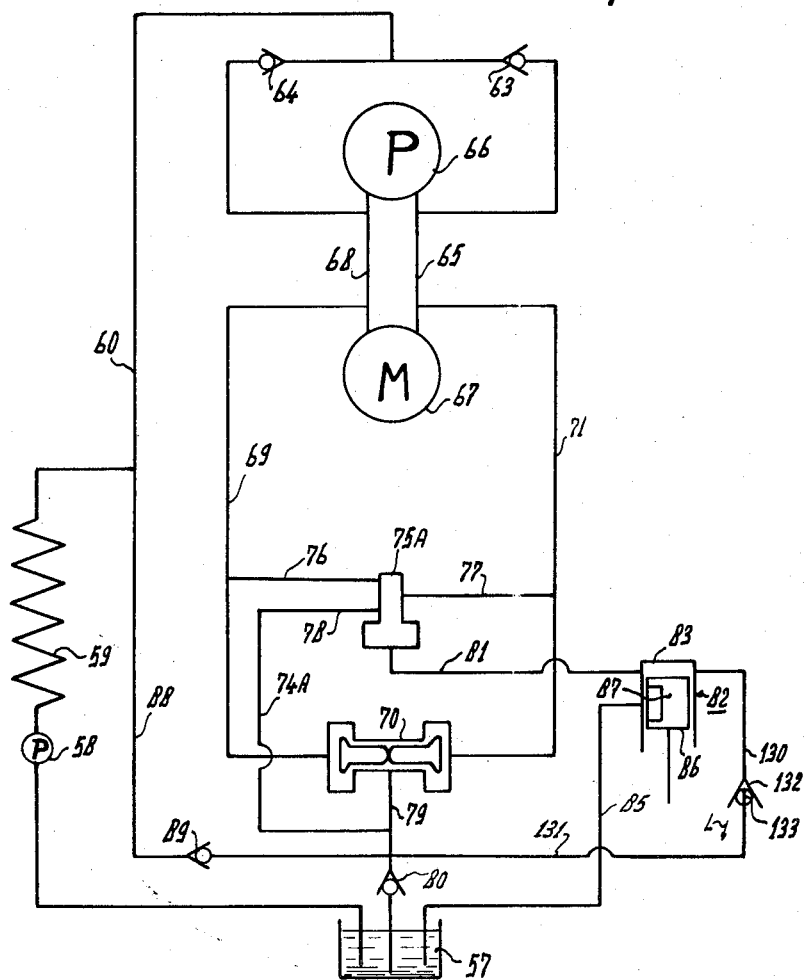

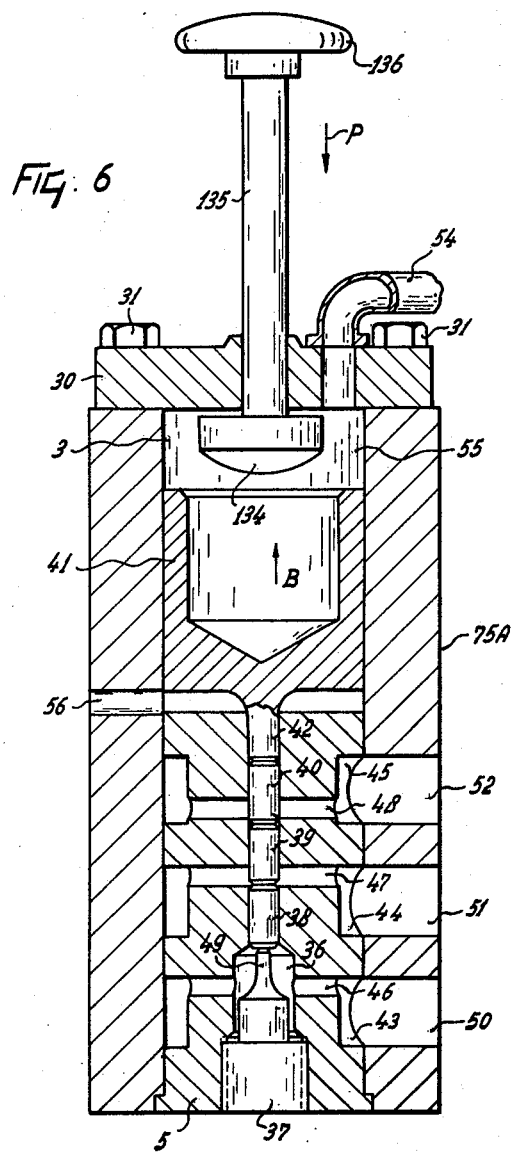

United States Patent Office 3,182,454
Patented May 11, 1965

3,182,454
CONTROLLING MECHANISMS AND HYDRAULI-
CALLY OPERATED POWER TRANSMISSION
SYSTEMS
Cornelius Otto Jonkers, Delft, and Foppe Hilbertus Fock-
ens, Maasland, Netherlands, assignors to C. van der
Lely N.V., Maasland, Netherlands, a Dutch limited-
liability company
Filed July 10, 1962, Ser. No. 209,484
Claims priority, application Netherlands, July 18, 1961,
267,231
26 Claims. (Cl. 60—53)

The invention relates to controlling mechanisms and hydraulically operated power transmission systems.

In accordance with the invention there is provided a controlling mechanism which establishes an open communication, when a given pressure of a fluid in a space is exceeded, between said space and a space in which a lower pressure prevails, wherein the controlling mechanism contains a chamber in which blocking members, dividing the chamber into compartments, are adapted to be displaceable, the chamber communicating with at least three spaces which communicate each, in a given position of an associated blocking member, with the associated compartment of the chamber which is shut off from the compartments with which the other spaces communicate by the blocking members, there being provided means which tend to hold the blocking members in said given position and one of a first blocking member defining at least part of the chamber which communicates with a first space and one end of a second blocking member defining at least a part of the chamber which communicates with a second space, the arrangement being such that when a given pressure of fluid supplied either to the first space or the second space is exceeded at least one of the blocking members is displaced by the fluid, and when the pressure in the second space exceeds a given value, the second space communicating, after such displacement via the chamber with the third space.

Thus, by means of a simple mechanism, the maximum pressure in different compartments can be controlled.

In accordance with a further aspect of the invention there is provided a hydraulically operated power transmission system comprising a hydraulic pump and a hydraulic motor, and in which system fluid subjected to higher pressure flows from the pump to the motor and fluid subjected to lower pressure flows from the motor towards the pump, the higher-pressure part of the fluid circuit being adapted to communicate with a first space in which a lower pressure prevails, said communication including a first blocking device, which is kept closed in normal operation by means of a fluid contained in a second space which is shut by means of a second blocking device which is adapted to automatically establish an open communication, when a given pressure in the second space is exceeded, between the second space and a third space in which a lower pressure prevails, so that the first blocking device may be opened.

In this manner a simple mechanism can be obtained in order to limit the maximum pressure in the high-pressure part of the fluid circuit.

In accordance with another aspect of the invention there is provided a hydraulically operated power transmission system comprising a hydraulic pump and a hydraulic motor, in which system fluid subjected to higher pressure flows from the pump to the motor and fluid subjected to lower pressure flows from the motor to the pump there being provided a supplemental pump by means of which fluid is fed to the lower-pressure part of the fluid circuit, which lower-pressure part of the fluid circuit communicates with a container, which communication is closed in normal operation by means of a blocking device which establishes an open communication between the low-pressure part of the fluid circuit and the container when a given pressure in the lower-pressure part of the fluid circuit is exceeded, the supplemental pump communicating with the container by way of a member which passes fluid at and above a given pressure difference on either side of said member, which fluid can flow to the container via the blocking device.

There can thus be prevented in a simple manner excessively high values of pressure from the supplemental pump.

In accordance with a further aspect of the invention there is provided a valve housing comprising at least three spaces and accommodating two relatively co-operating valves, in which, when fluid under pressure is fed to a first space of the valve housing, this fluid closes a first valve and the first valve opens a second valve so that a first space of the valve housing is shut off from a third space and a second space of the valve housing obtains an open communication with the third space and in which, when fluid under pressure is fed to the second space, the second valve is closed, this second valve opening the first valve and the first space obtaining a communication with the third space, the second space being shut off from the third space.

For a better understanding of the invention and to show how the same may be readily carried into effect, reference will now be made to the accompanying drawings, in which:

FIG. 5 shows a second diagram of the arrangement of various members in a hydraulically operated power transmission system.

FIG. 6 shows a second embodiment of a controlling mechanism according to the invention.

Figure 1:
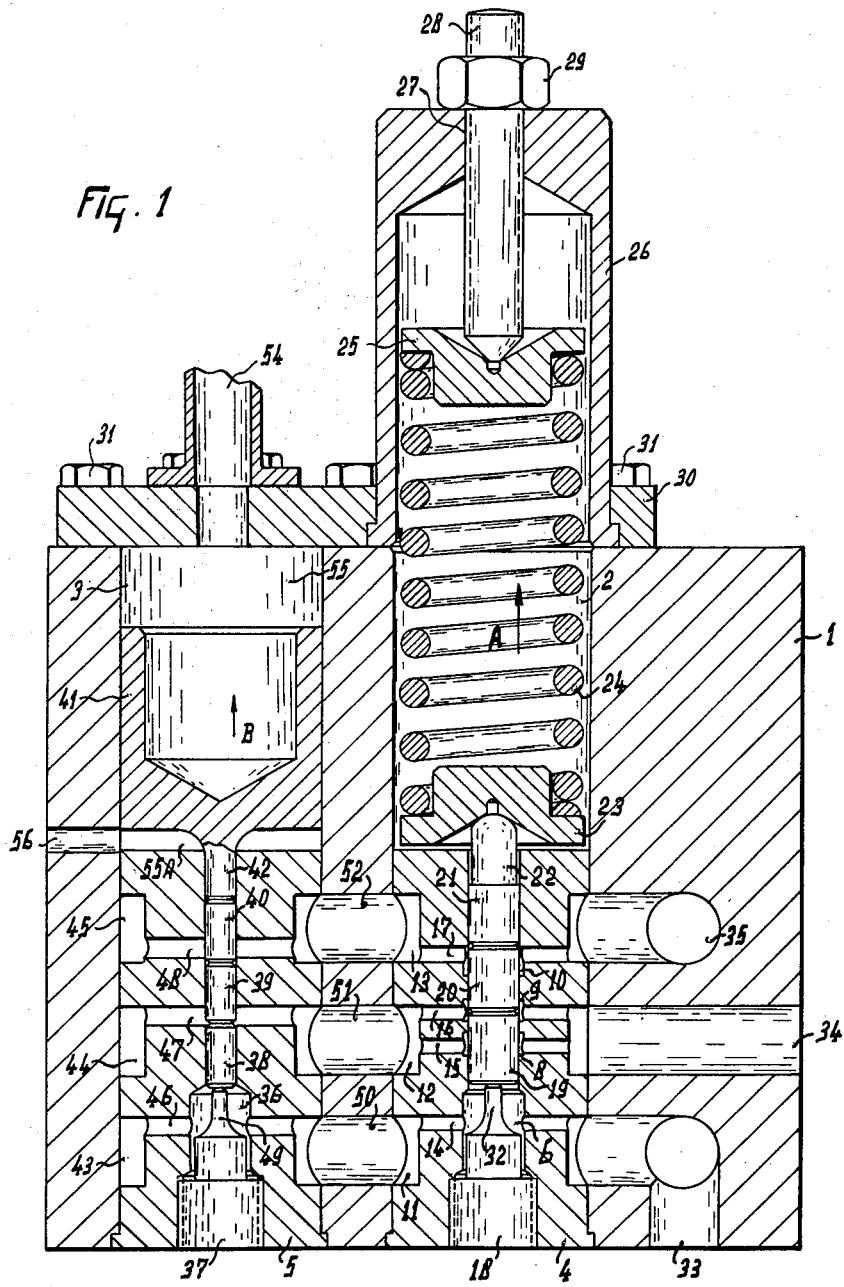
FIG. 1 is a sectional view of a controlling mechanism according to the invention.

FIG. 1 shows a valve housing 1, containing two cylindrical openings 2 and 3 in which sleeves 4 and 5 respectively are accommodated. These sleeves are preferably pressed in the housing. The sleeve 4 has a channel or chamber 6, in the wall of which are provided annular channels 8, 9 and 10. The outer wall of the sleeve 4 contains annular channels 11, 12, 13. The annular channel 11 communicates via channels 14 with the channel 6, the annular channel 12 communicates via channels 15 with the annular channel 8 and via channels 16 with the annular channel 9. The annular channel 13 communicates via channels 17 with the annular channel 10.

One end of the channel 6 is shut by a plug 18, which is screwed into the sleeve 4. In the channel 6 blocking members are provided and are formed by cylindrical slides 19, 20 and 21. These slides are adapted to be axially displaceable in the channel 6, but are arranged to have a minimum amount of play in a radial direction. The slide 21 is provided with a cylindrical prolongation 22, the diameter of which is smaller than the diameter of the slide 21. The slides 19 and 20 may be formed, for example, by the rollers of a roller bearing, since they have a high degree of accuracy.

The prolongation 22 of the slide 21 bears a spring cup 23 and a pressure spring 24 bears on the side of the spring cup 23 remote from the slide 21, the spring 24 being enclosed between the spring cup 23 and a second spring cup 25. The end of the spring 24 engaging the spring cup 25 projects beyond the cylindrical opening 2 in the valve housing 1 and is surrounded by a sleeve 26. The sleeve 26 is secured by means of a plate 30, which is fastened to the housing by bolts 31. The sleeve 26 is provided with a tapped hole 27, into which a bolt 28 is screwed, the spring cup 25 being urged by the spring 24 against the bolt 28, which is provided with a nut 29, whereby the bolt is locked in a given position.

The spring 24 urges the slide 19, 20 and 21 against each other, and in a direction opposite the arrow A. The movement of the slides in a direction opposite the arrow A is limited by a stop 32, formed by a prolongation of the plug 18. The length of the slides 19 and 20 is such that, when the slides are pressed one against the other and the slide 19 bears on the stop 32, the ends of the slides 19 and 20 are in contact with each other and these ends are then located in the annular channel 9. The channel 14 and the stop 32 are arranged so that the channel 14 always communicates with that part of the channel 6 which accommodates the side of the slide 19 remote from the slide 20.

The annular channel 11 communicates with a channel 33 in the housing 1. The annular channel 12 communicates with a channel 34 in the housing 1 and the annular channel 13 communicates with the channel 35 in the housing 1.

The sleeve 5 is provided with a channel or chamber 36, which is shut at one end by means of a plug 37, which is screwed into the sleeve. The channel 36 includes three members formed by cylindrical slides 38, 39 and 40 and a cylindrical member 42, which is integral with a piston 41. As before the slides may be formed by the rollers of a roller bearing.

In the outer wall of the sleeve 5 are provided annular channels 43, 44 and 45. The annular channel 43 communicates by means of channels 46 with the channel 36, the annular channel 44 communicates via channels 47 with the channel 36 and the annular channel 45 communicates via channels 48 with the channel 36.

The slides 38, 39 and 40 and the member 42 are adapted to be axially displaceable in the channel 36, but in a radial direction they have a minimum amount of clearance. The piston 41 is adapted to be displaceable axially in the cylindrical hole 3, but in a radial direction it also has a minimum amount of clearance.

The movement of the slides 38 to 40 and the piston 41 is limited in one direction by a stop 49, formed by the end of the plug 37, with which one end of the slide 38 can come into contact. The position of the stop 49 in the channel 36 is such that the channel 46 opens out in that part of the channel 36 in which is located that end of the slide 38 which is in contact with the stop 49. The length of the slides 38 is such that the end thereof, which is in contact with the ends of the slide 39, is located in that part of the channel 36 into which the channel 47 opens when the end of the slide 38, co-operating with the stop 49, bears on the stop 49.

The annular channel 43 communicates via a channel 50 in the housing 1 and the annular channel 11 with the channel 33. The annular channel 44 communicates via a channel 51 in the housing 1 and the annular channel 12 with the channel 34. The annular channel 45 communicates via a channel 52 in the housing 1 and the annular channel 13 with the channel 35.

The sleeve 4 with the slides 19, 20 and 21 constitutes a blocking means or safety valve, whereas the sleeve 5 with the slides 38, 39 and 40 and the piston 41 constitutes a blocking means or checking valve. The operation of these valves or controlling mechanisms will be described more fully hereinafter.

The safety valve may be caused to communicate, via channel 33 for example with a space containing a fluid subjected to a higher pressure than the fluid contained in a space communicating with the channel 34. Then the fluid subjected to pressure flows through the channel 33 into the annular space 11 and via the channels 14 into that part of the channel 6 in which the stop 32 and the end of the slide 19 bearing on the stop are arranged. The slide 19 is urged, as stated above, via the slides 21 and 20 by the spring 24 against the stop 32. The bias of the spring 24 can be adjusted by means of the bolt 28 to a given value. As long as the force exerted by the fluid under pressure on the slide 19 does not exceed the force exerted by the spring 24, the slides 19, 20 and 21 continue occupying the positions shown. However, if the pressure to which the fluid is subjected becomes too high, the slides 19, 20 and 21 will be displaced against the spring pressure. When the slide 19 has been displaced over a given distance, an open communication is established between the annular channel 11 and the annular channel 12 via the channels 14, the channel 6 and the channels 15. The fluid under pressure can then flow away by way of this communication through the channel 34.

The safety valve may, however, also be employed, when it is not the channel 33 but it is, for instance, the channel 34 which communicates with a space containing fluid subjected to a higher pressure than fluid in a space communicating with the channel 35. If the channel 34 communicates with the pressure space, the fluid under pressure will flow via the annular channel 12 and the channels 16 into the annular channel 9. The interengaging ends of the slides 19 and 20 are preferably not perfectly flat, so that the fluid under pressure can be readily urged between the slides 19 and 20. If desired, the ends of the slides may be shaped more or less in a convex form, so that the fluid can penetrate even more readily in between the slides. If the pressure to which the fluid is subjected exceeds a given value, the slides 20 and 21 will be displaced against the pressure of the spring 24. After the slide 20 has been displaced over a given distance, the annular channel 12 will obtain an open communication by way of the channels 16, the channel 6, the channel 10 and the channels 17 with the annular channel 35. From the channel 34 the fluid can then flow away through the channel 35.

It will be obvious that the sleeve 4 may be prolonged and a greater number of slides may be arranged in the channel 6 of the sleeve, while a greater number of ducts may be provided for the controlling member.

The checking valve operates as follows.

When the space containing the high-pressure fluid communicates with the channel 33, the said fluid will flow via the annular channel 11, the channel 50, the annular channel 43 and the channels 46 into that part of the channel 36 in which the stop 49 and the end of the slide 38 bearing on this stop are located. The high-pressure fluid tends to displace the slides 38, 39 and 40 and the piston 41 in the direction of the arrow B. This may be avoided, however, by introducing via a duct 54 a fluid under pressure into the spaces 55 above the piston 41. Owing to the great difference in diameters of the piston 41 and the slide 38 the pressure of the fluid in the space 55 may be considerably lower than the pressure of the fluid contained in the space communicating with the channel 33, without the slide and the piston starting a movement in the direction of the arrow B. The fluid in the space 55 may be compressible, so that, when a given pressure on the sides of the slides remote from the piston 41 is exceeded, the fluid in the space 55 is compressed and the slides are displaced in the direction of the arrow B. If the fluid is incompressible, the slides can be displaced in the direction of the arrow B, if the fluid can flow away via the duct 54 out of the space 55.

When the slides 38 to 40 are displaced in the direction of the arrow B, the annular channel 43 obtains an open communication by way of the channels 46, the channel 36 and the channels 47 with the annular channel 44. The fluid under pressure can then flow out of the annular channel 44 through the channel 51 and the annular channel 12 into the channel 34.

The checking valve may, however, also be used, if the channel 34 communicates with a space containing a fluid subjected to a higher pressure. Thus the fluid under pressure can flow via the annular channel 12, the channel 51, the annular channel 44 and the channels 47 to the channel 36. The high-pressure fluid is then pressed in between the interengaging ends of the slides 38 and 39. If the space 55 also contains fluid under pressure, a movement of the slides 39 and 40 and the piston 41 in the direction of the arrow B may be prevented. However, if the pressure in the space 55 drops and/or the pressure of the fluid in the channels 47 increases, as is described above for the case in which the channel 33 communicates with a space containing fluid under pressure, the slides 39 and 40 are urged away in the direction of the arrow B. The annular channel 44 thus gets into open communication via the channels 47, the channel 36 and the channels 48 with the annular channel 45. The fluid under pressure can then flow away via the channel 52 and the annular channel 13 through the channel 35.

It will be obvious that also in this case by prolonging the sleeve 5 and by increasing the number of slides in the channel 6 a greater number of channels can be linked to the checking valve. It will furthermore be obvious that the safety valve and the checking valve may be employed independently of each other.

Any fluid which may flow along the walls of the piston 41 or along the slide 40 and the part 42 into the space 55A beneath the piston 41, can be conducted away via the opening 56.

The valve mechanism described above may be employed successfully in a hydraulic transmission mechanism. This will be described more fully with reference to the diagram of FIG. 2.

Figure 2:
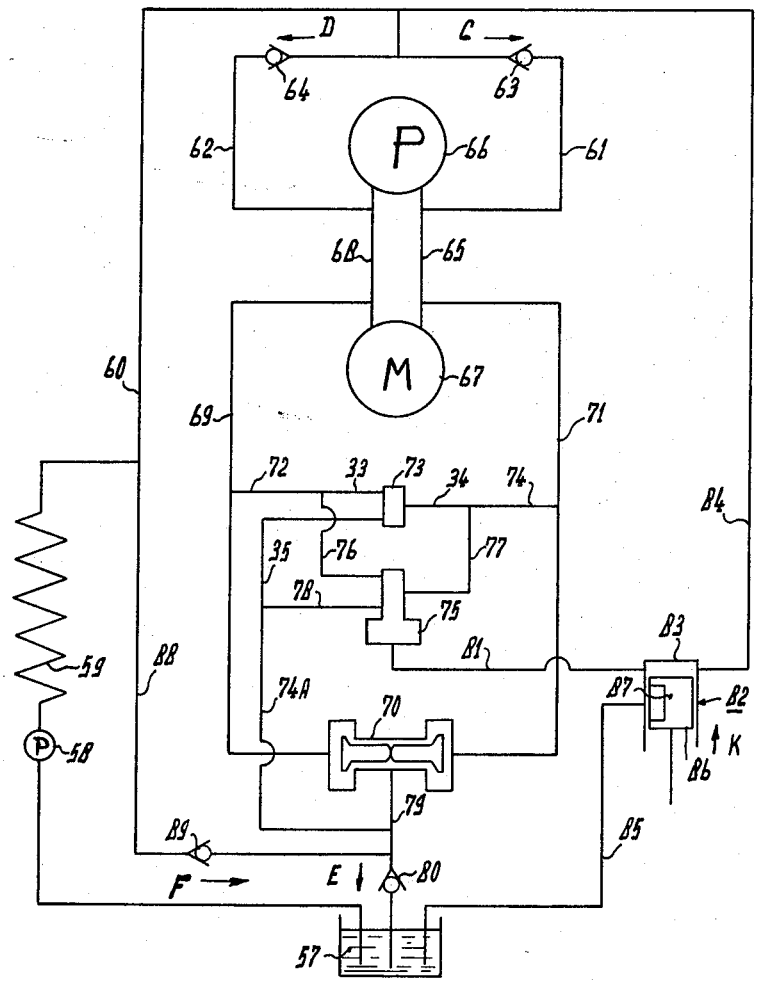
FIG. 2 shows a diagram of the arrangement of various members in a hydraulically operated power transmission system.

From FIG. 2 it will be seen that a supply container 57 containing a fluid communicates with a supplemental pump 58. The pump 58 communicates with a liquid cooler 59 which communicates with a duct 60 linking the pump 58 with the ducts 61 and 62. The duct 61 includes a valve 63 and the duct 62 includes a valve 64. The valve 63 allows fluid to pass only in the direction C, whereas the valve 64 allows fluid to pass only in the direction of the arrow D. The duct 61 communicates with a duct 65, which links a hydraulic pump 66 to a hydraulic motor 67. The duct 62 communicates with a duct 68, which constitutes a second link between the hydraulic pump 66 and the hydraulic motor 67.

The duct 68 communicates via a duct 69 with a valve housing 70 shown diagrammatically and illustrated in detail in FIG. 3, the construction of which will be described more fully hereinafter. The duct 65 also communicates, by means of a duct 71, with the valve housing 70. The duct 69 communicates via a duct 72 with a safety valve 73, which correspond with the channel 33 and the safety valve shown in FIG. 1. The duct 71 communicates via a duct 74 with channel 34 of the safety valve 73. The channel 35 of the safety valve 73 communicates with a duct 74A.

There is also shown diagrammatically a checking valve 75, which is similar to the checking valve shown in FIG. 1. In the diagram of FIG. 2 the channel 33 communicates via a duct 76 with the checking valve. This duct 76 virtually corresponds to the communication formed in the valve mechanism shown in FIG. 1 by the annular channel 11, the channel 50 and the annular channel 43. The channel 34 is linked in the diagram by means of a duct 77 to the checking valve 75. This duct corresponds in fact with the communication formed in the valve mechanism shown in FIG. 1 by the annular channel 12, the channel 51 and the annular channel 44. The checking valve furthermore communicates with the channel 35 by means of a duct 78. The duct 78 is formed in the valve mechanism shown in FIG. 1 by the annular channel 13, the channel 52, and the annular channel 45.

The duct 74A communicates with a duct 79, which includes valve 80, which passes fluid only in the direction of the arrow E. By way of the valve 80 fluid can flow out of the duct 79 into the supply container 57. The valve housing 70 also communicates with the duct 79 at such a place that oil flowing out of the valve housing 70 can flow only via the valve 80 into the supply container 57.

The checking valve 75 communicates furthermore via a duct 81 which corresponds in fact with the duct 54 shown in FIG. 1, with a control-slide 82. The control-slide 82 comprises a housing 83, with which a duct 84 and a duct 85 communicate. The housing 83 contains a piston-shaped body 86 which is adapted to be capable of reciprocating in the housing. The piston-shaped body contains a duct 87. The duct 84 communicates with the duct 60, with which a duct 88 communicates, which duct 88 includes a valve 89, which passes fluid only in the direction of the arrow F. The end of the duct 88 is linked to the duct 79 so that fluid flowing out of the duct 88 can pass only via the valve 80 to the supply container 57.

Figure 3:
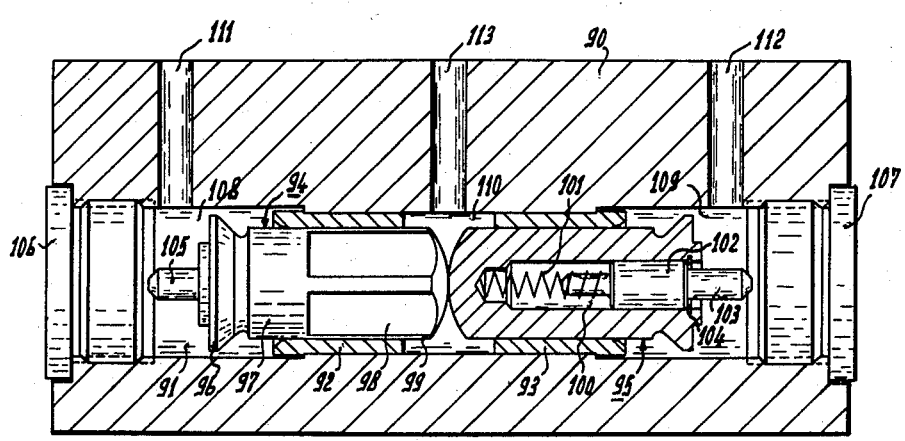
FIG. 3 is a sectional view of a valve housing.

The valve housing 70 is shown in detail in FIG. 3. The valve housing comprises a housing 90, in which a cylindrical space 91 is provided. The cylindrical space accommodates sleeves 92 and 93, which surround valves 94 and 95. The valve 94 comprises a valve cap 96, a cylindrical portion 97 and a portion 99 provided with recesses 98. The diameter of the cylindrical portion 97 of the valve 94 is equal to the diameter of the bore of the sleeve 92, so that the cylindrical portion of the valve 94 can completely close the passage of the sleeve 92. The valve 95 has the same external shape as the valve 94 and is shown in FIG. 3 in a sectional view.

From FIG. 3 it will be seen that the valve comprises a recess 100, which accommodates a spring 101 and a cylindrical body 102, which has an end portion 103. The spring 101 tends to urge the cylindrical body 102 out of the recess 100. This is prevented, however, by a stop formed by a ring 104. The valve 94 contains in a similar manner a spring and a cylindrical body. FIG. 3 shows only the end 105 of this cylindrical body. The two ends of the cylindrical space 91 are closed by plugs 106 and 107. The cylindrical space 91 is divided by the valves and the sleeves into three space 108, 109 and 110. The space 108 communicates via a duct 111 with the duct 69, the space 109 communicates via a duct 112 with the duct 71 and the space 110 communicates via a duct 113 with the duct 79 (see also FIG. 2).

If in the spaces 108 and 109 the pressure is the same and if in the space 110 the pressure is equal to or lower than the pressure in the spaces 108 and 109, the valves 94 and 95 will occupy the positions shown in FIG. 3. In these positions of the valves the spaces 108, 109 and 110 do not communicate with each other, since the cylindrical portions 97 of the valves completely close the passage of the sleeves 92 and 93. If, for example, the valve 95 is moved to the right, the end 103 comes into contact with the plug 107, so that the movement of the cylindrical portion 102 is limited. Upon a further movement of the valve 95 to the right, the spring 101 is compressed since the valve and the cylindrical body, between which the spring is enclosed, are displaced relatively to each other. The compressed spring 101 tends to urge the valve back into the position shown in FIG. 3.

Since the spring 101 and the cylindrical body 102 are accommodated in the recess 100, provided in the valve 95, a simple and compact valve mechanism construction is obtained. The recess 100 constitutes at the same time a guide for the cylindrical body 102.

Figure 4:
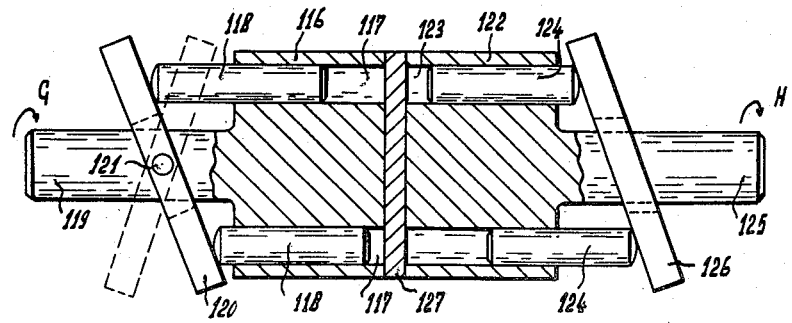
FIG. 4 shows diagrammatically a hydraulically operated power transmission system.

The power transmission system as shown in FIG. 2 formed by the pump 66 and the motor 67, may comprise, for example, an axial piston pump and an axial piston motor, shown diagrammatically in FIG. 4. The pump comprises a housing 116, in which bores 117 are provided. Plungers 118 are adapted to be axially displaceable in these bores. To the housing 116 is secured a shaft 119. There is further provided a swash-plate 120, which controls the plungers 118. The swash-plate 120 is adapted to turn about a shaft 121, disposed at right angles to the shaft 119. The motor comprises a housing 122, in which bores 123 are provided. These bores accommodate axially displaceable pistons 124. The housing 122 has secured to it a shaft 125. The pistons 124 are governed by swash-plate 126. Between the pump and the motor there is provided a port-plate 127, in which slots are provided to form a communication between the pump and the motor. These slots are not shown in the figure. In the diagram shown in FIG. 2 the slots are represented by ducts 65 and 68.

If the pump is driven in the direction of the arrow G, while the swash-plate 120 of the pump occupies the position shown in full lines, the motor will rotate in the direction of the arrow H. Then the pump will press fluid under high pressure for example through the duct 68 towards the motor, whereas low-pressure fluid will flow from the motor through the duct 65 towards the pump (see FIG. 2).

If the swash-plate 120 of the pump is turned into the position indicated in broken lines, while the direction of rotation of the pump remains the same, the motor will rotate in a direction opposite the arrow H. By varying the position of the swash-plate 120 with a constant number of revolutions of the pump, the number of revolutions of the motor can be varied. If the swash-plate 120 occupies a position in which it is at right angles to the shaft 119, the pistons 118 will not reciprocate in the bores 117, when the housing 116 turns. Thus no fluid will flow from the pump to the motor, so that the motor stands still.

The mechanism shown in the diagram of FIG. 2 operates as follows.

It will be supposed that the pump 66 passes fluid, for example oil, under a higher pressure through the duct 68 to the motor 67, while fluid under a lower pressure passes from the motor 67 through the duct 65 to the pump 66. In this case the fluid in the duct 69 is also subjected to the higher pressure. The duct 69 communicates with the valve housing 70, i.e. with the duct 111, which establishes the communication between the duct 69 and the space 108 (FIG. 3). The high-pressure fluid urges the valve 94 against its seat, formed by the end of the sleeve 92. The space 108 is thus completely cut off from the space 110, so that no high-pressure fluid can flow this way. Since the valve 94 has been displaced to the right by the high-pressure fluid, the valve 95 has been urged to the right by the valve 94. The displacement of the valve 95 is such that the spaces 109 and 110 and thus the ducts 71 and 79 (FIG. 2), are in open communication with each other via the recesses 98 in the portion 99 of the valve 95. Also via the duct 72, the channel 33 of the safety valve 73 and the channel 76, communicating with the checking valve, are in communication with the high-pressure part of the circuit.

The duct 65, through which the fluid flows back from the motor to the pump, is subjected, as a rule, to a considerably lower pressure than the duct 68. The duct 65 communicates with the duct 71, which in turn communicates with the valve housing 70, by way of the duct 112 which opens out in the space 109. As stated above, the space 109 is in open communication via the recesses 98 in the portion 99 of the valve 95 with the space 110. The fluid can flow out of the space 110 via the duct 113 into the duct 79. This duct contains the valve 80, which passes fluid only when a given pressure, for example 10 atmospheres, in the duct 79 is exceeded. When the valve is open, the fluid can flow away to the supply container 57.

The duct 71 communicates via the duct 74 with the channel 34 of the safety valve 73 and the valve 75 communicates via the duct 74 and the duct 77 with the duct 71.

The supplemental pump 58 draws fluid from the supply container 57 and pushes it via the cooler 59 into the duct 60. The valve 64 in the duct 62 is held closed by the high-pressure fluid in the duct 62 and thus the fluid furnished by the pump 58 can flow only via the valve 63 into the duct 61, communicating with the duct 65. The pump 58 supplies, in operation, a constant flow of fluid in order to compensate for any leakage in the pump 66 and the motor 67. Since the quantity of fluid fed from the pump 58 is considerably larger than the quantity of fluid leaking away via the pump 66 and the motor 67, a quantity of fluid flowing from the motor 67 to the pump 66 will constantly flow via the duct 71, the valve housing 70, the duct 79 and the valve 80 to the supply vessel 57. It is thus ensured that constantly a quantity of cooled fluid is fed to the system, while a quantity of warm fluid can flow away.

It will be apparent that the valve 80 determines the maximum pressure which may occur in the lower-pressure part of the cycle.

Via the duct 84, the regulating slide 82 and the duct 81, the checking valve 75 is in communication with the duct 60. The duct 81 communicates with the space 55, which accommodates the piston 41 (see FIG. 1). In this space fluid is available, which is subjected to the same pressure as that prevailing in the ducts 60, 61 and 71. Under the action of this pressure the piston 41 and the slides 38, 39 and 40 are held in the positions shown in FIG. 1 against the action of the higher-pressure fluid in the annular channel 43 (i.e. the pump output pressure, in the channel 33 and duct 76).

The maximum pressure in the high-pressure part of the system is determined by the bias of the spring 24. If the pressure in the duct 68 between the pump 66 and the motor 67 becomes excessively high, the slides 19, 20 and 21 are displaced in the direction of the arrow A (FIG. 1), against the pressure of the spring 24, since the space of the channel 6, accommodating the end of the slide 19, bearing on the stop 32, is in open communication with the high-pressure part of the circuit. An open communication is thus established between the channel 33 and the channel 34. Thus the high-pressure side of the pump is linked via the ducts 69 and 72 and the valve housing 73 to the low-pressure side, so that the excess pressure on the high-pressure side disappears or will at least be considerably reduced. The pressure on the low-pressure side can not exceed a given value, in accordance with the adjustments of the valve 80.

Linking of the high-pressure part of the system to the low-pressure side, when a given pressure in the high-pressure part of the system is exceeded, has the advantage that no undesirable quantity of fluid can flow away from the circuit, which might be the case, if the high-pressure part of the system, when a given pressure is exceeded, were in open communication with the supply vessel. It might then occur, for example, that a vacuum would be produced in the system.

It is also possible for the pump 66 to press fluid via the duct 65 to the motor 67, while fluid flows from the motor 67 via the duct 68 towards the pump 66. In this case the duct 71 is associated with the high-pressure part of the system, whereas the duct 69 is associated with the low-pressure part of the system.

The fluid under higher pressure flows from the duct 71 via the duct 112 into the space 109 (FIG. 3). The fluid under higher pressure then urges the valve 95 against the seat formed by the end of the sleeve 93, so that the valve 94 is displaced to the left by means of the valve 95. Thus an open communication is established via the duct 69, the duct 111, the space 108 and the recesses 98 in the portion 99 of the valve 94 for the lower-pressure part of the system with the space 110 and the duct 79, communicating with said space 110 via the duct 113.

The valve 63 is held closed by the fluid in the duct 61, subjected to higher pressure and the fluid fed by the pump 58 can flow via the valve 64 and the duct 62 into the duct 68, subjected to lower pressure. The excess quantity of oil can flow via the duct 69, the valve housing 70, the duct 79 and the valve 80 to the supply vessel 57.

The channel 34 of the safety valve 73 and the duct 77 of the checking valve then communicate via the duct 74 with the high-pressure part of the system.

If the pressure in the system becomes excessively high, the slides 20 and 21 (FIG. 1) are displaced in the direction of the arrow A against the spring pressure of the spring 24, so that an open communication is formed between the channel 34 and the channel 35. The channel 35 communicates via the duct 74A with the duct 79, which is in open communication via the valve housing 70 with the low-pressure part of the system. When a given pressure is exceeded in the high-pressure part of the system, said part is thus linked to the low-pressure part of the system.

The space 55 which comprises the piston 41 of the checking valve 75, also communicates with the low-pressure part of the system via the duct 81, the regulating slide 82 and the duct 84. If the piston-shaped body 86 is displaced in the direction of the arrow K, the duct 81 communicates via the duct 87 in the piston-shaped body 86 with the duct 85. Thus the fluid under pressure can flow out of the space 55 to the supply vessel 57. The duct 84 is at the same time shut off by the piston-shaped body 86, so that no fluid can flow out of this duct.

If the duct 68 is associated with the high-pressure part of the system, also the duct 76, which in fact corresponds to the duct 50 and the annular channel 43, will communicate with the high-pressure part of the system. If the pressure in the space 55 falls, the piston 41 with the slides 38, 39 and 40 will be urged away in the direction of the arrow B (FIG. 1), so that an open communication is established between the duct 76 and the duct 77, the latter corresponding in fact with the annular channel 44 and the duct 51, as is shown in FIG. 1. In this case also a communication is obtained between the high-pressure part of the system and the low-pressure part thereof.

If the duct 77 communicates with the high-pressure part of the system, i.e. if the fluid is pressed via the duct 65 of the pump 66 towards the motor 67, the piston 41 with the slides 39 and 40 will be displaced, when the pressure in the space 55 falls off, whereas the slide 38 stays in the position shown in FIG. 1. Thus an open communication is formed between the duct 77 and the duct 78, so that again the high-pressure part communicates with the low-pressure part.

If a pump of the kind shown in FIG. 4 is employed, the piston-like body 86 of the regulating slide 82 may be coupled with the mechanism, which controls the swash-plate 120. The coupling is preferably such that, if the swash-plate 120 is orthogonal to the shaft 119, the duct 81 is in open communication via the duct 87 in the piston-like body 86 with the duct 85, which opens out in the supply vessel 57. Thus, in the central position of the swash-plate 120, the pump is prevented from driving the motor. It might occur that the swash-plate 120 is not accurately orthogonal to the shaft, so that, when the pump is driven, the pistons 118 still perform a small movement in the bores 117, oil being thus pressed from the pump towards the motor. However, if the space 55 above the piston 41 is in open communication with the supply vessel, the piston 41 with the slides 38 and/or 39 and 40 will be displaced in the direction of the arrow B by the fluid under pressure as soon as a given increase in pressure occurs in the duct 76 or in the duct 77, so that an open communication will be established between the high-pressure part and the low-pressure part of the system, the pump being thus prevented from driving the motor.

Consequently, if the swash-plate 120 of the pump occupies its central position, the duct 71 and the duct 69 are in open communication with each other, so that the pressure in both ducts is substantially the same. Thus the valves 94 and 95 will occupy the positions shown in FIG. 3. When the supplemental pump 58 is driven, the fluid displaced by the pump cannot be conducted away via the ducts 69 and/or 71 the valve housing 70 and the duct 79, since the valves 94 and 95 block the communication between the ducts 69 and 71 and the duct 79.

In order to prevent the pressure in the system from assuming excessively high values, the fluid can flow away via the valve 89 and the valve 80 towards the supply vessel 57. The valve 89 may be adjusted so that it opens with a pressure difference of 2 atmospheres on either side of the valve, so that the fluid can flow away in the direction of the arrow F. In normal operation a pressure of, for example, 10 atmospheres will prevail on either side of the valve 80 in the duct system, when the valve 80 is adjusted to said value.

If the swash-plate of the pump is in its central position, the pressure in the duct 88 may rise to 12 atmospheres, so that the valve 89 is opened and the fluid can flow away towards the supply vessel.

It is common practice to link the suction side and the compression side of the supplemental pump 58 to each other by means of a safety valve in order to avoid an excessive increase in pressure in the system if the oil fed by the supplemental pump is not conducted away. The pressure at which such a safety valve is opened will be adjusted in the mechanism described above for example so that it exceeds by 10% the pressure at which the valve 80 is opened. This required, however, a considerably heavier valve than the valve 89 employed in the arrangement shown in FIG. 2. In this case a correct adjustment of the pressure at which the safety valve is opened given rise to great difficulties. With the disposition of the safety valve 89, shown in FIG. 2, the adjustment of the valve is less critical, so that a simple valve may be used.

The combination of pump and motor shown in FIG. 4 may be employed for driving a vehicle, for example an agricultural tractor. The shaft 125 is then coupled with the driven wheels. With such a drive there exists a certain relationship between the pressure in the high-pressure part of the system and the exerted tractive force. The spring 24 can then be arranged so that the pressure in the high-pressure part falls off before the tractive force rises to a value such that the tractor tends to "rear."

It will be obvious that, when the swash-plate of the pump is in its central position, the tractor can also be towed, when the motor of the transmission gear is coupled with the hindwheels of the tractor. The fluid displaced by the motor can flow away via the checking valve 75, so that the pump of the transmission gear is not driven.

FIG. 5 shows a further diagram which corresponds at least mainly with the diagram of FIG. 2. The various corresponding parts are therefore designated by the same reference numerals.

In the arrangement shown in FIG. 5, however, the safety valve 73 is omitted and the maximum pressure occurring in the transmission gear in normal operation is controlled in this arrangement by means of a checking valve 75A, which is shown in FIG. 6 and which corresponds substantially with the checking valve shown in FIG. 1. Similar component parts are denoted by the same reference numerals. The duct 76, which corresponds with the channel 50 and the channel 43, communicates directly with the duct 69; and the duct 77, which corresponds to the channel 51 and the channel 44, communicates directly with the duct 71. The duct 78 is formed by the ducts 52 and 45.

From FIG. 5 it will furthermore be seen that the control slide 82 does not communicate via the duct 84 with the duct 60, but it communicates by way of the duct 130 and a duct 131 with the duct 79. Between the duct 130 and the duct 131 is arranged valve 132, which opens when the pressure in the duct 130 exceeds the pressure in the duct 131, so that fluid can flow away in the direction of the arrow L. The valve will be opened, for example, with a pressure difference of 1 to 2 atmospheres. The valve comprises a duct 133, having a small diameter, so that, if the pressure in the duct 131 exceeds that in the duct 130, fluid can flow gradually through the duct 133 to the duct 130, the pressure difference between the two ducts being levelled.

If the pressure in the duct 69 or 71 exceeds a given value, the piston 41 of the checking valve 75A is displaced in the direction of the arrow B (FIG. 6), the fluid in the ducts 81 and 130 being thus subjected to an increase in pressure so that the valve 132 is opened and the fluid can flow away through the duct 131 and the valve 80 to the supply vessel 57. Thus an open communication is established between the ducts 69 and 71.

When the piston 41 is displaced, the pressure in the duct 130 increases, in general, so rapidly, if an incompressible fluid is used, that there cannot be obtained a state of equilibrium on either side of the valve, since the fluid flows away through the duct 133, the passage of which is fairly small.

It will be obvious that the value of the pressure in the ducts 69 or 71 between which this open communication is formed, depends upon the ratio between the sectional areas of the slides 38 and 39 and the sectional area of the piston 41 and the value of the pressure with which the valves 132 and 80 are opened. When the pressure in the space 55 falls off, the valve 132 is again urged against its seat by the fluid under pressure in the duct 131. Then the fluid under pressure in the duct 131 can flow gradually through the duct 133 in the valve 132, the duct 130 and the duct 81 to the space 55, in which a pressure is thus gradually regained, so that the slides 38 to 40 are moved into the positions shown in FIG. 1.

The valve 132 is not strictly required in this system, since the mechanism is capable of operating without this valve. The valve 132 prevents, however, a rapid production of the pressure in the space 55, so that the slides 38 to 40 will not be abruptly moved into the positions shown in FIG. 1, which would result in a rapid closure of the open communication between the ducts 69 and 71. In the case of the change described above this might give rise to a sudden stop of the drive via said gear, whereas it might be restricted abruptly thereafter.

Since the duct 131 is in direct communication with the duct 79, a short communication can be obtained between the valve 75A and the valve 80, the ducts between these valves not representing an undesirable resistance, so that when the pressure in the duct 69 or 71 exceeds a given value, an open communication is rapidly established between these ducts.

From FIG. 6 it will furthermore be seen that the space 55 of the valve housing accommodates a piston-like body 134 which is fastened to a rod 135 journalled in a hole provided in the lid 30. The free end of the rod is provided with a knob 136 and by pushing the knob 136 in the direction of the arrow P the piston-like body comes into contact with the piston 41 and the piston 41 with the slides 38 to 40 can be held in the positions shown in FIG. 6. This is important, for instance, when the transmission gear with the valve described above is incorporated in a vehicle, while it is desirable to start the engine of the vehicle by moving the vehicle, so that the engine must be started via the driven wheels and the gear. Since the supplemental pump is usually also driven by the engine of the vehicle, no fluid is supplied by the pump, when the engine stands still and, as a rule, the pressure in the space 55 will be too low to hold the piston 41 in the position shown when the motor urges fluid towards the pump, so that the slides in the channel 36 are displaced and an open communication is formed between the ducts 68 and 65.

It will be evident that the engine of the vehicle can in this case not be set rotating via the driven wheels. By holding the piston 41 by means of the piston-like body in the position shown in FIG. 6, no communication is established between the ducts 65 and 68, so that the engine can be started from the driven wheels via the change-speed gear. When the engine has started, oil will again flow into the space 55 and the piston-like body 134 returns into the position shown, when the knob 136 is released.

What we claim is:

1. A controlling mechanism comprising a chamber having a closure at one end and a plurality of displaceable blocking members slideable therein, said blocking members dividing the chamber into compartments, said chamber communicating with at least three spaces, each of said spaces being associated with a compartment of said chamber, said compartments being shut off from said spaces by said members in closed position, means for holding said members in said closed position, a first blocking member defining the upper limits of one of said compartments which communicates with a first space, a second blocking member defining the upper limits of a second compartment which communicates with a second space whereby excessive pressure of fluid supplied to either space will displace at least one of said members and excessive pressure in the second space will displace said second member so that the second space communicates with the third space.

2. A controlling mechanism as claimed in claim 1, wherein the mechanism forms part of a hydraulically power transmission system, which includes a hydraulic pump and a hydraulic motor, fluid subjected to higher pressure flowing from the pump to the motor and fluid subjected to lower pressure flowing from the motor to the pump, the first space corresponding to the fluid circuit of the transmission system, which, in normal operation, prevails at a different pressure from the pressure prevailing in a further part of the fluid circuit of the transmission system, said further part corresponding to the second space.

3. A controlling mechanism as claimed in claim 1, wherein at least one of the blocking members is displaceable under the action of the fluid contained in the first space, said first space being placed in communication with the second space through the chamber.

4. A controlling mechanism as claimed in claim 1, wherein the chamber and the blocking members comprise a channel and piston-like bodies, respectively.

5. A controlling mechanism as claimed in claim 1, wherein the chamber is provided in a sleeve having holes, said holes being in communication with the spaces and the chamber.

6. A controlling mechanism as claimed in claim 5, wherein the sleeve is contained in a housing, said housing having ducts communicating with the spaces.

7. A controlling mechanism as claimed in claim 6, wherein the periphery of the sleeve has grooves, the holes of the sleeve and the ducts of the housing communicating with the grooves.

8. A controlling mechanism as claimed in claim 7, wherein the holes provided in the sleeve open out into recesses provided in the chamber.

9. A controlling mechanism as claimed in claim 5, wherein the distance between the hole communicating with that part of the chamber in which the point of contact of a first and second blocking member is located and the hole through which the fluid can flow through the chamber out of the second space into the third space is smaller than the length of one blocking member.

10. A controlling mechanism as claimed in claim 1, wherein in the position in which the three spaces communicating with the chambers are shut off from each other by the displaceable blocking members, said members bear one on the other, at least one blocking member being in contact with a stop, said stop limiting the movement of the blocking members in one direction.

11. A controlling mechanism as claimed in claim 10, wherein the means which tends to hold the blocking members in a closed position comprises a spring which urges the blocking members in a direction towards the stop.

12. A controlling mechanism as claimed in claim 11, wherein the bias of the spring is adjustable.

13. A controlling mechanism as claimed in claim 12, wherein the end of one of the blocking members projects beyond the sleeve, the spring force being exerted on the end of the blocking member concerned.

14. A controlling mechanism as claimed in claim 10, wherein, under the force exerted by a fluid on the blocking members, the members are urged in a direction towards the stop.

15. A controlling mechanism as claimed in claim 14, wherein means are opened under excessive pressure of the fluid and the fluid is in communication through said means with a further space having a lower pressure.

16. A controlling mechanism as in claim 15, wherein the said means is a valve.

17. A controlling mechanism as claimed in claim 14, wherein the blocking members cooperate with a piston-like body on which a fluid exerts a given pressure in order to hold the blocking members in a given position, said body and said blocking members each having a section, the section of the piston-like body being larger than the section of a blocking member.

18. A hydraulically operated power transmission system including a hydraulic pump and a hydraulic motor, wherein fluid subjected to higher pressure flows from the pump to the motor and fluid subjected to lower pressure flows from the motor towards the pump, a higher pressure part of the fluid circuit being adapted to communicate with a first space in which a lower pressure prevails, a first blocking device for closing said communication, a second space containing fluid under pressure for urging said first blocking device in closed position, said second space being normally closed by a second blocking device, a third space, said second space being adapted to automatically establish communication, when the pressure in the second space is excessive, between the second space and the third space so that the first blocking device may be opened.

19. A system as claimed in claim 18, wherein the pump is prevented from feeding fluid to the motor whereby the second space is brought into communication with the third space so that the first blocking device is also opened.

20. A system as claimed in claim 18, wherein means is provided for closing the first blocking device independently of the pressure of the fluid.

21. A system as claimed in claim 18, wherein the second space forms part of the lower-pressure part of the fluid circuit.

22. A system as claimed in claim 18, wherein the lower-pressure part of the fluid circuit communicates with a supply container via the second blocking device, which establishes an open communication between the low-pressure part and the container, when a given pressure in the low-pressure part is exceeded.

23. A system as claimed in claim 22, wherein a member is provided between the second space and the second blocking device which member is opened when a given pressure in the second space is exceeded, said member having a narrow passage whereby there is constantly a communication between the second space and the second blocking device.

24. A hydraulically operated power transmission system including a hydraulic pump and a hydraulic motor wherein fluid subjected to higher pressure flows from the pump to the motor and fluid subjected to lower pressure flows from the motor to the pump, a supplemental pump for feeding fluid to the lower pressure part of the fluid circuit, said lower-pressure part of the fluid circuit being in communication with a container, said communication with the container being closed in normal operation by a blocking device which establishes an open communication between the lower-pressure part of the fluid circuit and the container when a given pressure in the lower-pressure part of the fluid circuit is exceeded, said supplemental pump communicating with the container through a member which passes fluid above a given pressure difference on either side of said member whereby fluid can flow to the container via the blocking device.

25. A system as claimed in claim 24, wherein the blocking device is a valve.

26. A system as claimed in claim 24, wherein the member which passes fluid at a given pressure difference on either side of said member is formed by a valve.

References Cited by the Examiner

UNITED STATES PATENTS

| | | | |
|---|---|---|---|
| 683,273 | 9/01 | Grey | 137—112 |
| 776,061 | 11/04 | Hewett | 137—112 |
| 2,541,292 | 2/51 | Robinson | 60—53 |
| 2,797,551 | 7/57 | Adams et al. | 60—97 |
| 2,926,496 | 3/60 | Heckenkamp | 103—42 X |
| 3,085,403 | 4/63 | Hamblin et al. | 60—53 X |

JULIUS E. WEST, *Primary Examiner.*

EDGAR W. GEOGHEGAN, *Examiner.*